Aug. 5, 1958     D. SEXTON     2,846,175
SUPPORT FOR TREE-TOPPING APPARATUS
Filed Jan. 18, 1954
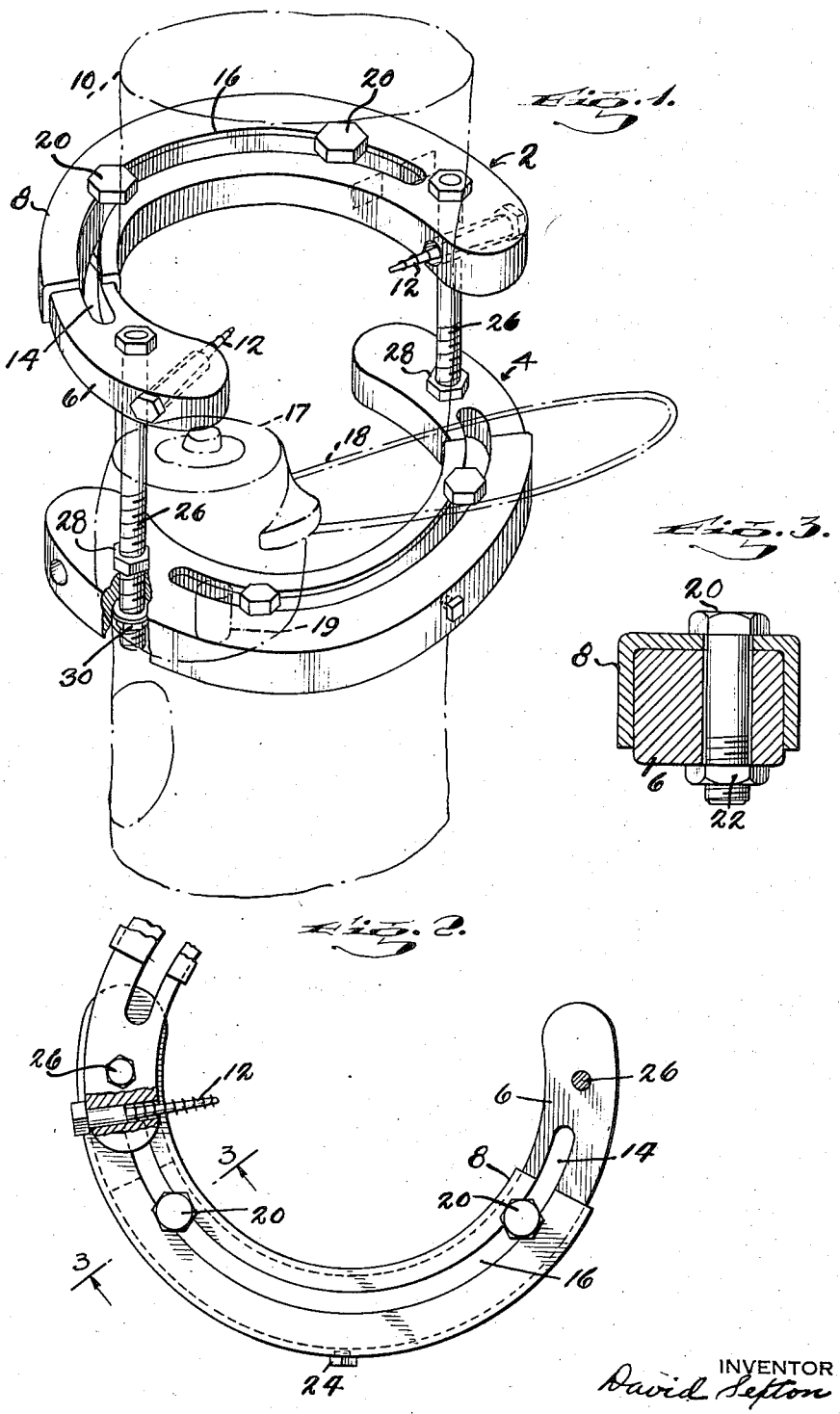
INVENTOR
David Sexton
BY
James G. Bethell
ATTORNEY

United States Patent Office 2,846,175
Patented Aug. 5, 1958

2,846,175

SUPPORT FOR TREE-TOPPING APPARATUS

David Sexton, Irvington, N. J.

Application January 18, 1954, Serial No. 404,610

1 Claim. (Cl. 248—230)

This invention relates to tree-topping devices and is primarily directed to means for attaching a power-driven saw to the tree to be topped whereby the operator is relieved of all effort so far as any necessity for supporting the saw in operative position is concerned.

It is customary in the tree-topping industry for the operator to support the saw by hand while topping the tree, and not only does this require a great deal of skill on the operator's part but is dangerous as well. In the present construction, the means by which the saw is held in position is so arranged that it is feasible for the operator to remain on the ground; but in any event he is not required to support the saw in position, nor does he run any danger of being injured as the top falls.

More specifically, the present invention provides a clamp adapted to be attached to the tree trunk, this clamp, when in place, being rigidly held to the tree. The clamp is so constructed and arranged as to accommodate trees of different diameters, and so that the two cuts—initial cut and back cut—which are made in topping a tree may be spaced at different distances from each other, which is quite desirable to accommodate my equipment to trees of different diameters.

Still more specifically, my invention provides tree-topping equipment in which two saw-supporting elements are employed. These two elements in operation are fastened to opposite sides of the tree trunk, one element supporting the saw for the initial cut at one side of the tree and the other element supporting the saw for the final cut at the opposite side of the tree, these cuts being spaced from each other vertically of the tree. The saw-supporting elements are adjustable lengthwise so as to accommodate trees of different diameters, and they are adjustable as to their spacing from each other so that, for trees of different diameters, the spacing of the initial and final cuts may be varied.

In the accompanying drawings, in which I have illustrated an embodiment of my invention, Fig. 1 is a perspective view of my improved equipment, showing the same fastened to the trunk of a tree which is to be topped;

Fig. 2 is a fragmentary plan view; and

Fig. 3 is a section on the line 3—3 of Fig. 2.

Referring to the drawings in detail, my improved tree-topping equipment comprises a pair of saw-supporting straps or jaws, an upper strap 2 and a lower strap 4. These straps are of metal and identical in construction. Because of their identical construction, a detailed description of one strap will suffice. The strap 2, for example, comprises an arcuate-shaped element 6, mounted to slide within a cooperating arcuate-shaped element 8 to vary the length of the strap. Both members are broad-faced, so that a substantial bearing is provided between the two, which makes for a rigid, yet at the same time easily adjustable construction. The two elements 6 and 8 are made longitudinally adjustable, to permit the strap to be adjusted to accommodate trees of different diameters. It is to be understood that the curve of the strap is not precisely that of the trunk of a tree to which the same may be attached, but it is desirable and advantageous to make this provision for varying the strap length so that the strap encircles about half of the tree trunk.

The tree trunk has been designated 10, and, to attach the straps to this trunk, each end of each strap is provided with a lag screw 12, which may be driven or screwed into the tree trunk when the device is being placed in operative position.

As appears from Fig. 1 in particular, the two elements 6 and 8 of each saw-supporting strap on jaw are provided with arcuate slots 14 and 16, respectively, which, with the parts assembled, register with each other. These slots receive the bolts 20, which pass through both elements 6 and 8 and are provided at their lower ends with a nut 22, the stem of each bolt, as will be plainly seen from the drawings, lying in the slots 16. Obviously, by tightening the nuts 22 after setting 6 and 8 to the proper length, these two elements will be clamped securely and rigidly to each other against relative movement. Further to insure against movement of the elements 6 and 8, relatively to each other longitudinally, I provide set screw 24, which passes through the flange of the element 8 into contact with the adjacent flange of element 6. The saw 18, shown in phantom on the drawing, rests upon one or the other of the straps 2 and 4 so as to be supported thereby. The frame 17 of the saw is provided with a suitably shaped projection 19 at its bottom, which projection, with the saw in place, will project into the registered slots 14 and 16 of the saw-supporting strap and at the same time allow the frame to be rocked about a vertical axis to vary the depth of cut and extent of cut made by the saw.

It will be appreciated from all of the foregoing that the virtual diameter of each of the straps 2 and 4 may be adjusted independently of the other, and that the lengthening or shortening of one strap has no effect upon the other.

The two straps 2 and 4 are spaced from each other vertically, and this spacing may be varied so as to vary the vertical spacing of the cuts made by the saw 18. As will appear from the drawings, the two straps 2 and 4 are attached to each other by adjustable bolts 26, each of which is provided with a nut 28, adapted to bear upon the upper face of the element 8, for instance. Each bolt 26 is provided further with a nut 30, which bears against the underside of element 8. Consequently, by rotating the bolts 26, while holding the nuts 28 and 30 against turning, the two straps of the device may be caused to approach each other or to move away from each other, to vary the spacing between the two so as to vary the spacing of the two cuts to be made in a tree trunk by a power saw mounted on the straps.

The specific type of saw employed constitutes no part of my invention. However, I prefer an electrically driven saw, in which case the controls for the same may be on the ground, so that an operator may remain on the ground while the equipment is in operation. After making the initial cut into one side of the tree trunk, with the saw mounted on the lower saw-supporting strap 4, it will be understood that the saw is then mounted on the upper strap for the final or back cut.

It will be appreciated that, when a tree is topped, the falling top will not disarrange or disturb the saw-supporting straps nor the saw carried thereby.

What I claim is:

In a support for the saw of a tree-topping apparatus, the combination of a pair of arcuate saw-supporting straps, each strap comprising two telescoping, relatively adjustable sections for varying the length of the strap to accommodate tree trunks of different diameters, the two sections of each strap being provided with arcuate slots;

bolts passing through said slots for clamping the two sections of each strap to each other to hold the sections in adjusted position; tie bolts for attaching the saw-supporting straps to each other with the concaved faces of the straps facing each other in vertically spaced relation, said bolts being adjustable to vary the vertical distance between straps; and means carried by the straps for anchoring the straps to a tree trunk.

References Cited in the file of this patent

UNITED STATES PATENTS

| | | |
|---|---|---|
| 1,547,915 | Hirn | July 28, 1925 |
| 1,997,947 | Pantek | Apr. 16, 1935 |
| 2,612,724 | Llewellyn | Oct. 7, 1952 |